United States Patent [19]

Sawamura et al.

[11] Patent Number: 5,339,357
[45] Date of Patent: Aug. 16, 1994

[54] TELEPHONE DIALING SYSTEM WITH ERROR INDICATING FUNCTION

[75] Inventors: Kouji Sawamura; Yuzo Moriuchi, both of Yokohama, Japan

[73] Assignee: Matsushita Electric Industrial Co., Ltd., Osaka, Japan

[21] Appl. No.: 820,776

[22] Filed: Jan. 15, 1992

[30] Foreign Application Priority Data

Jan. 24, 1991 [JP] Japan .................. 3-007166

[51] Int. Cl.$^5$ ............................................. H04M 1/27
[52] U.S. Cl. ................................... 379/355; 379/354
[58] Field of Search ............... 379/354, 355, 356, 199, 379/200

[56] References Cited

U.S. PATENT DOCUMENTS

| | | | |
|---|---|---|---|
| 4,930,155 | 5/1990 | Kurokawa | 379/355 X |
| 5,136,637 | 8/1992 | Rust et al. | 379/355 X |

FOREIGN PATENT DOCUMENTS

| | | | |
|---|---|---|---|
| 0228692 | 10/1985 | Fed. Rep. of Germany | 379/200 |
| 58-222648 | 12/1983 | Japan . | |
| 0007751 | 1/1989 | Japan | 379/355 |
| 1209849 | 8/1989 | Japan . | |
| 1286659 | 11/1989 | Japan . | |
| 2182066 | 7/1990 | Japan . | |
| 2219343 | 8/1990 | Japan . | |

*Primary Examiner*—James L. Dwyer
*Assistant Examiner*—Mugdy Shehata
*Attorney, Agent, or Firm*—Stevens, Davis, Miller & Mosher

[57] ABSTRACT

A telephone dialing system includes a memory unit for storing a dialed telephone number, a comparator for comparing first digit data of the dialed telephone number stored in the memory unit and second digit data of a telephone number presently being manually dialed and providing a first output when more than half of the digits of the first and second digit data coincide with each other while less than half of the digits of the first and second digit data do not coincide with each other so that the presently dialed number is an incorrectly dialed number and a second output when more than half of the digits of the first and second digit data do not coincide with each other so that the presently dialed number is a new number. An alarm unit issues an alarm in response to the first output. A speech output unit generates a speech output announcing the dialed telephone number stored in the memory unit. A confirmed dialed telephone number sending unit sends out the dialed telephone number announced by the speech output unit in response to a selection input generated by a user via manipulation of a specified special function key. A display unit provides a luminous or flickering display in response to the first output from the comparator unit. A comparative display distinguishably displays the coincidence part and the non-coincidence part of the first and second individual digit data.

12 Claims, 3 Drawing Sheets

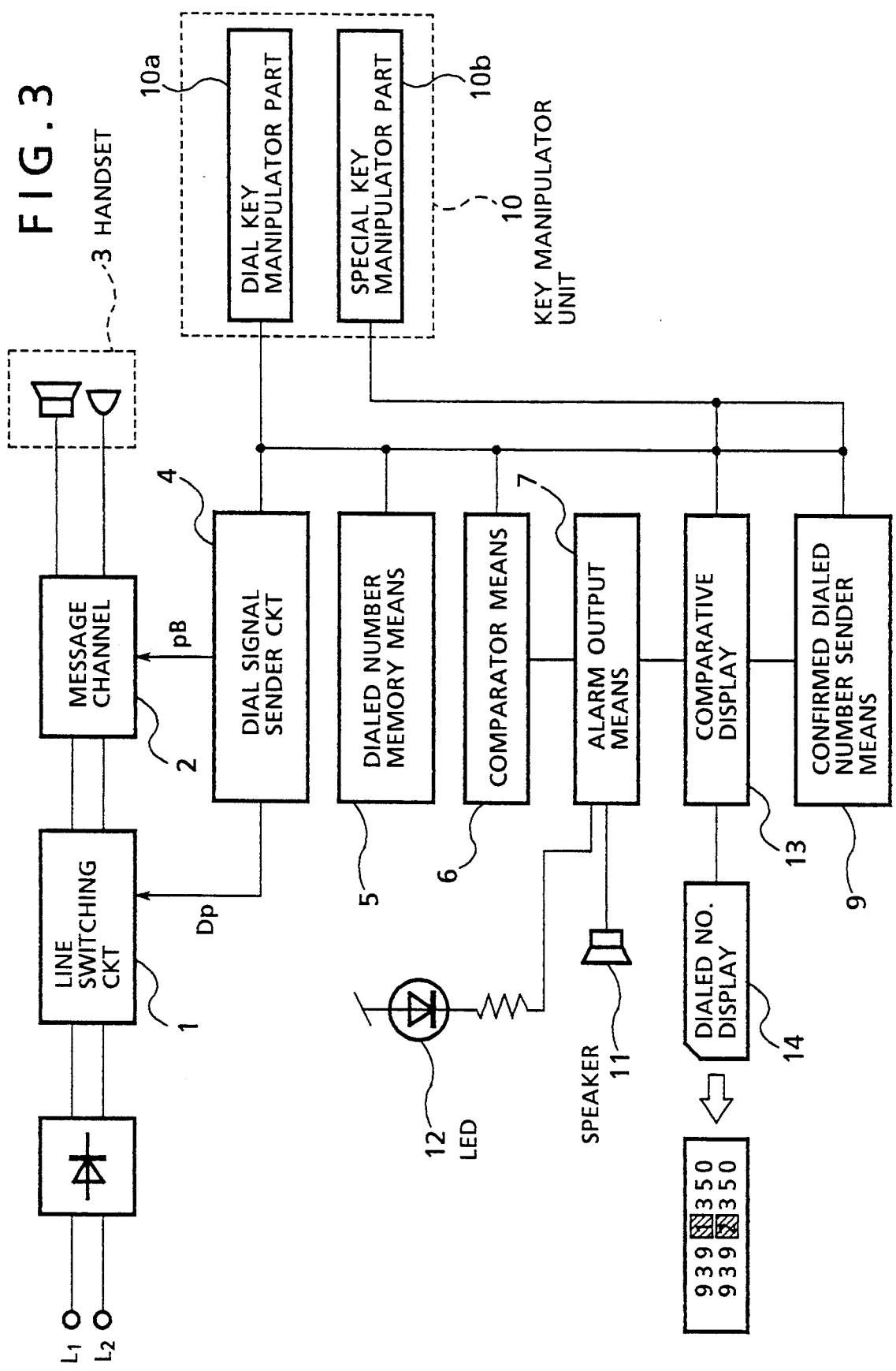

TELEPHONE DIALING SYSTEM WITH ERROR INDICATING FUNCTION

BACKGROUND OF THE INVENTION

This invention relates to a dialing system for use in, for example, a telephone system connected to a telephone line.

A prior art dialing system of this kind is provided with a re-dialing function so that a telephone number dialed before and stored can be sent out again to a central office line in response to a selection input applied by manipulation of a specified special key.

However, in the prior art dialing system described above, the number of telephone numbers that can be registered for the utilization of the re-dialing function was limited. Therefore, the prior art dialing system had such a problem that, when a telephone number that had been dialed before but not registered in the re-dialing function was manually dialed again by the subscriber, the subscriber would not become aware of having dialed a wrong telephone number even if he dialed such a wrong telephone number.

SUMMARY OF THE INVENTION

With a view to solve such a prior art problem, it is an object of the present invention to provide a dialing system in which, when a telephone number dialed before and stored is dialed again by inadvertent incorrect dial manipulation, an alarm is issued so that the subscriber is informed of having dialed a wrong telephone number and can confirm the correct telephone number on the basis of a speech output, and the correct telephone number can be sent out automatically by manipulation of a specified special key.

Another object of the present invention is to provide a dialing system in which a telephone number dialed already and stored and a telephone number presently being then manually dialed are separately displayed respectively, and a coincidence part and a non-coincidence part of them can be distinguished from each other by, for example, a flickering, on-and-off or intermittent light display.

According to the present invention which attains the first object, there is provided a dialing system for use in a telephone system, comprising dialed telephone number memory means for storing a dialed telephone number consisting of a required number of digits, comparator means for comparing individual digit data of the dialed telephone number stored in the dialed number memory means and those of a telephone number being presently then manually dialed, alarm output means for issuing an alarm when more than half of the digits of the individual digit data of the telephone numbers coincide with each other, but less than half of them do not coincide with each other as a result of comparison by the comparator means, speech output means for generating a speech output announcing the dialed telephone number stored and compared by the comparator means, and confirmed dialed telephone number sender means for sending out the dialed telephone number announced by the speech output means in response to a selection input applied by manipulation of a specified special key, whereby, when a wrong telephone number is dialed when a telephone number dialed before is newly manually dialed again, an alarm is issued, and the correct telephone number is confirmed on the basis of a speech signal so that the correct telephone number can be sent out again.

A modification of the dialing system according to the present invention comprises comparative display means for distinguishably displaying at least a coincidence part and a non-coincidence part of the individual digit data of the dialed telephone numbers compared by the comparator means so that, when the telephone number dialed and stored already is newly manually dialed again, the coincidence number part and the non-coincidence number part are distinguishably displayed by the comparative displays means, and luminous display means provided as desired, so that the coincidence number part and the non-coincidence number part can be visually distinguished from each other by, for example, a flickering display.

The dialing system of the present invention having the structure described above operates in the following manner. That is, when, under the condition in which a telephone number consisting of a required number of digits has been dialed before and stored in the dialed telephone number memory means, the corresponding telephone number is manually dialed again by dial key manipulation, the telephone number newly dialed is compared in the comparator means with the telephone number dialed before and stored in the dialed number memory means. When more than half of the digits of the digit data of the telephone numbers coincide with each other but less than half do not coincide with each other, the alarm output means issues the alarm, and the speech output means announces the dialed telephone number for the purpose of confirmation. Thus, when the manually dialed telephone number is confirmed to be wrong, the telephone number dialed before and stored in the dialed telephone number memory means is sent out again in response to a selection input applied by manipulation of a special key. Therefore, dialing of a wrong telephone number can be prevented before such a wrong telephone number is sent out.

In the modification of the dialing system in which the speech output means is replaced by the comparative display means, manual dialing of a wrong telephone number can be instantaneously visually confirmed on the display, and the correct telephone number can be similarly sent out again.

BRIEF DESCRIPTION OF THE DRAWINGS

FIG. 3 is a block diagram schematically showing the structure of another embodiment of the dialing system according to the present invention.

DESCRIPTION OF THE PREFERRED EMBODIMENTS

An embodiment of the dialing system according to the present invention will now be described by reference to FIG. 1 and 2.

Figure 1:
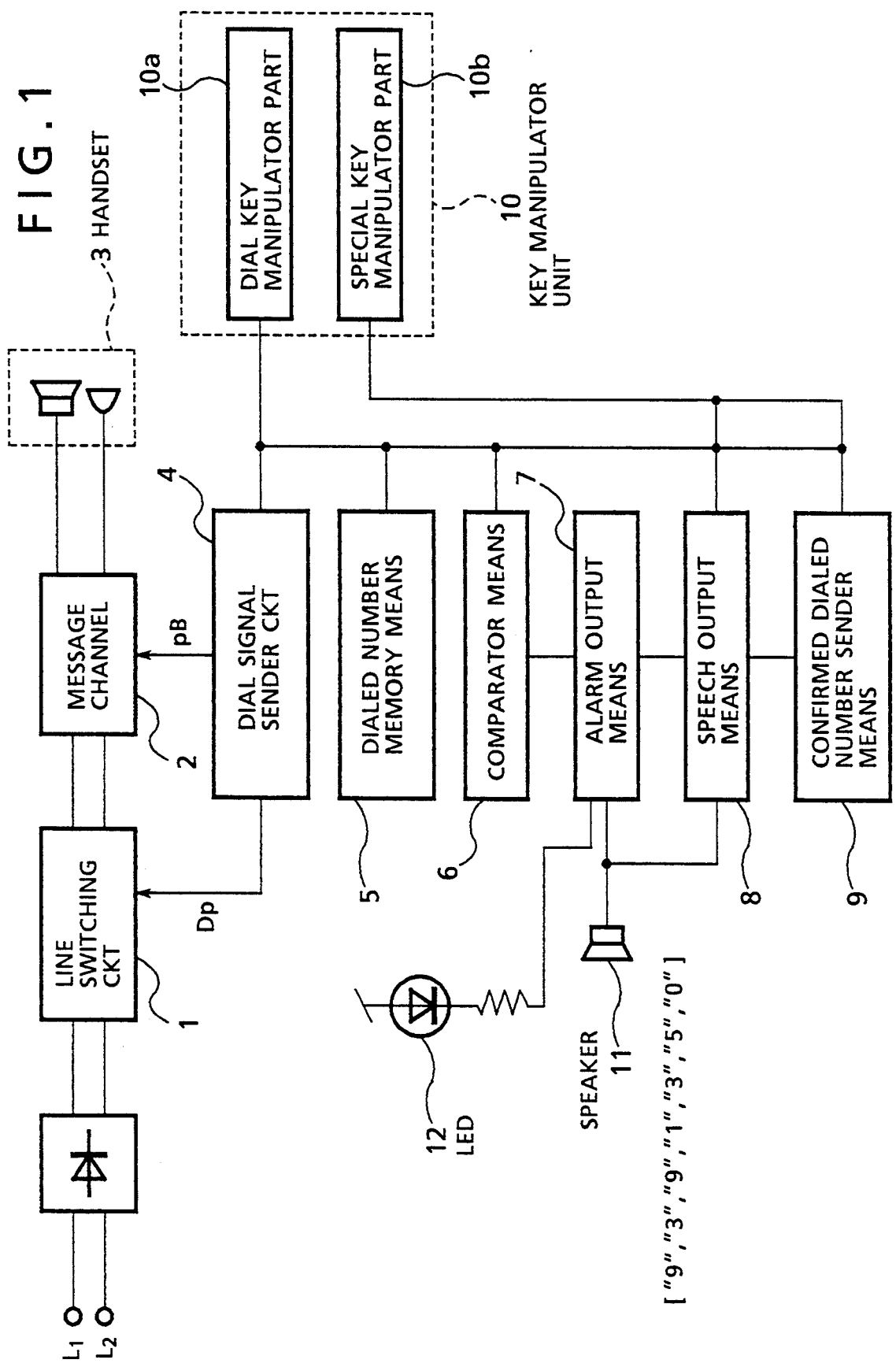
FIG. 1 is a block diagram schematically showing the structure of an embodiment of the dialing system according to the present invention.
Figure 2:
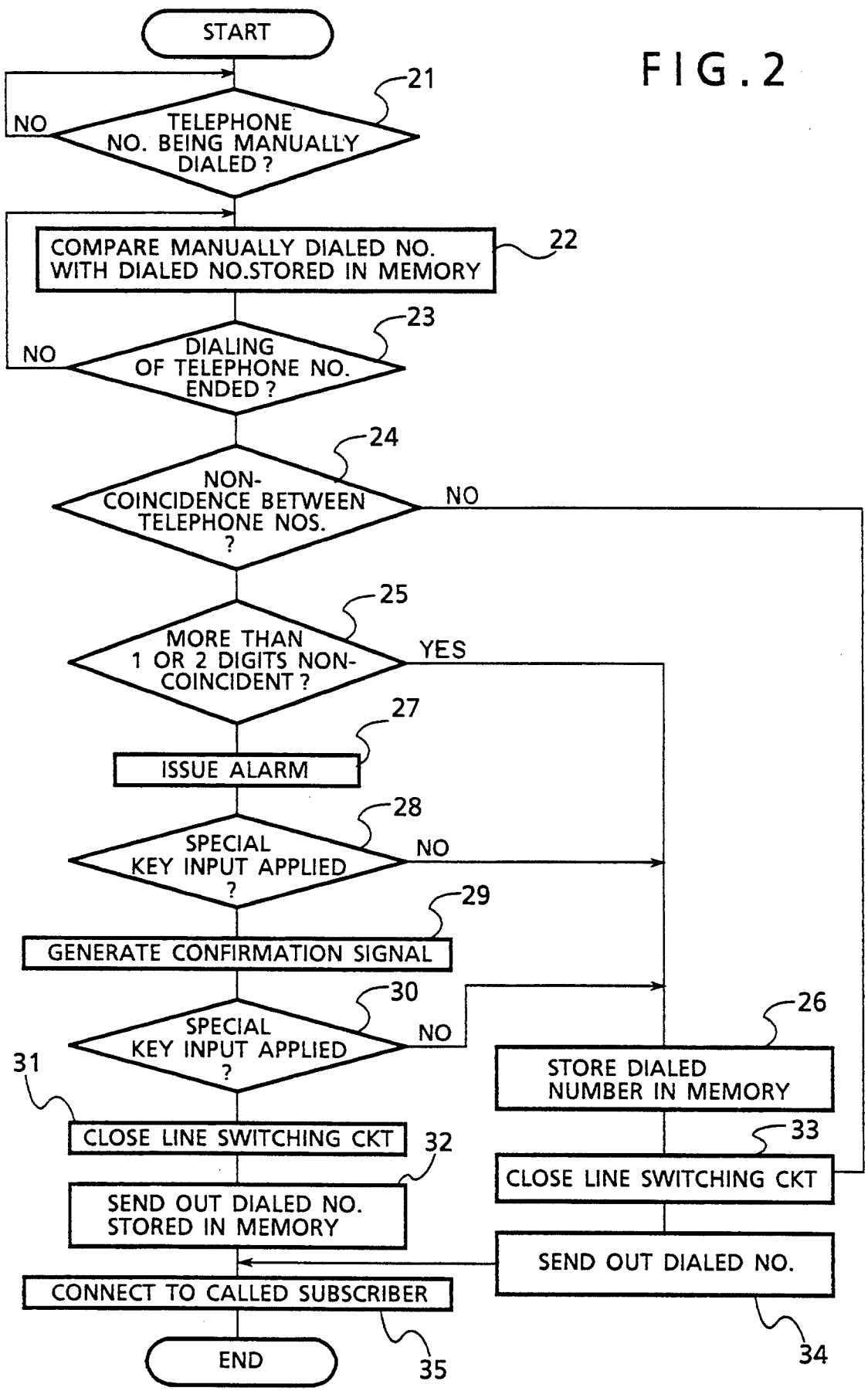
FIG. 2 is a flow chart showing the operation of the dialing system shown in FIG. 1.

Referring to FIG. 1, a telephone system includes a central office line switching circuit 1 which disconnectably connects the central office line to a message channel 2 and acts also to send out a dial pulse signal. The message channel 2 is connected to a handset 3 so that the subscriber can talk over the channel 2. A dial signal sender circuit 4 sends out a dialed telephone number consisting of a required number of digits to the central office line through the switching circuit 1 and the channel 2. The subscriber originates the telephone number by key manipulation on a dial key manipulator part 10a of a key manipulator unit 10. The dialed telephone number is stored in a dialed telephone number memory means 5. When a telephone number consisting of the required number of digits is then newly dialed by the subscriber by key manipulation on the dial key manipulator part 10a of the key manipulator unit 10, the individual digit data of the newly dialed telephone number are compared by a comparator means 6 with the respective digit data of the telephone number dialed before and stored in the memory means 5. When the result of comparison between these two telephone numbers by the comparator means 6 proves that the greater part (more than half of the digits) of the digit data coincide with each other but the remaining small number (less than half of the digits) of the digit data do not coincide with each other, the comparator generates an output indicating such condition and an alarm output means 7 issues an alarm signal by energizing a speaker 11 or by energizing or turning on-off an LED lamp 12 for flickering display. Also, a speech output means 8 acts to generate a speech output from the speaker 11. After dialing of a wrong telephone number is confirmed, a special key manipulator part 10b of the key manipulator unit 10 is manipulated so that the telephone number dialed before and stored in the memory means 5 is sent out to the central office line from a confirmed dialed telephone number sender means 9 through the dial signal sender means 4.

The operation of the embodiment shown in FIG. 1 will now be described in detail by reference to FIG. 2. It is supposed that, in this case, a telephone number consisting of a required number of digits dialed before is stored already in the dialed telephone number memory means 5.

First, in a step 21, a telephone number consisting of the required number of digits is dialed by new key manipulation on the dial key manipulator part 10a of the key manipulator unit 10. At the same time, in a step 22, the individual digit data of the telephone number being dialed are successively compared by the comparator means 6 with those of the telephone number dialed before and stored already in the memory means 5.

When the dialing of the telephone number on the dial key manipulator part 10a is completed in a step 23, the comparison between these two telephone numbers by the comparator means 6 ends in a step 24. When the result of comparison proves that the individual digit data of these two telephone numbers completely coincide with each other, the comparator means issues an output indicating this condition and the central office line switching circuit 1 is closed in a step 33, and the telephone number newly dialed is directly sent out to the central office line in a step 34. In a step 35, the handset 3 of the subscriber is connected to the handset of the called subscriber.

On the other hand, when the result of comparison in the step 24 proves that the individual digit data of the two telephone numbers do not completely coincide with each other, and non-coincidence of more than one or two digit data is detected in a step 25, that is, when the greater part of the digit data are non-coincident, and the remaining small number of the digit data only are coincident, the comparator means issues an output indicating this condition the telephone number newly dialed is regarded from the aspect of probability to be an entirely new telephone number that has not yet been stored in the memory means 5, and this newly dialed telephone number is stored in the memory means 5 in a step 26. Then, the central office line switching circuit 1 is similarly closed in the step 33, and the new telephone number dialed is sent out in the step 34 to the central office line through the dial signal sender circuit 4 so that the handset 3 of the subscriber is connected to the handset of the called subscriber in the step 35.

Further, when the number of non-coincident digit data is less than 1 or 2, that is, when the greater part of the digit data are coincident, and the remaining small number of the digit data only are non-coincident, the telephone number newly dialed is regarded from the aspect of probability to be attributable to wrong dialing of the telephone number stored in the memory means 5, and the comparator means 6 applies a signal to the alarm output means 7. In a step 27, the alarm output means 7 applies its output signal to the speaker 11 and the LED lamp 12, so that the speaker 11 issues an audible alarm, and the LED lamp 12 is energized or turned on-off to provide a flickering display. When, in response to the issuance of the alarm, the subscriber does not select a key input by manipulating the special key manipulator part 10b of the key manipulator unit 10 in a step 28, the telephone number newly dialed is regarded to be an entirely new telephone number that has not been stored in the memory means 5, and this telephone number is similarly newly stored in the memory means 5 in the step 26. Then, in the step 33, the central office line switching circuit 1 is closed, and the new telephone number dialed is sent out to the central office line through the dial signal sender circuit 4 in the step 34, so that the handset of the subscriber is connected to the handset of the called subscriber.

On the other hand, when the subscriber selects a key input by manipulating the special key manipulator part 10b of the key manipulator unit 10, the dialed telephone number compared by the comparator means 6 and stored in the memory means 5 is announced as an audible confirmation signal from the speaker 11 connected to the speech output means 8 in a step 29. (The confirmation signal announced in this case is, for example, "9", "1", "3", "5", "0".)

In this case, when the subscriber does not select the key input in a step 30 by manipulating the special key manipulator part 10b of the key manipulator unit 10 in response to the appearance of the audible confirmation signal, the newly dialed telephone number is similarly regarded to be an entirely new telephone number that has not been stored in the memory means 5, and this telephone number is newly stored in the memory means 5 in the step 26. Then, the central office line switching circuit 1 is closed in the step 33, and the telephone number dialed is sent out to the central office line through the dial signal sender circuit 4 in the step 34, and the handset 3 of the calling subscriber is connected to the handset of the called subscriber in the step 35.

On the other hand, when the subscriber selects the key input by manipulating the special key manipulator part 10b of the key manipulator unit 10, the central office line switching circuit 1 is closed in a step 31. Then, the dialed telephone number stored in the memory means 5 is sent out in a step 32 to the central office line through the dial signal sender circuit 4 by the function of the confirmed dialed telephone number sender means 9, and the handset 3 of the calling subscriber is connected to the handset of the called subscriber in the step 35.

Thus, in the embodiment described by reference to FIGS. 1 and 2, when the greater part of digit data of two telephone numbers coincide with each other but the remaining small number of the digit data do not coincide with each other as a result of comparison by the comparator means 6, the alarm output means 7 issues an alarm, and, in response to selection of a key input by manipulation of the special key manipulator part 10b of the key manipulator unit 10, a speech output for audible confirmation of the dialed telephone number is generated from the speaker 11 connected to the speech output means 8. When manual dialing of the telephone number is confirmed to be wrong, the subscriber selects the key input again by manipulation of the special key manipulator part 10b, so that the correct dialed telephone number stored in the dialed telephone number memory means 5 can be sent out to the central office line again by the function of the confirmed dialed telephone number sender means 9. Therefore, when a telephone number that has been sent out before is manually dialed again, sending-out of a wrong telephone number can be prevented without fail.

FIG. 3 is a block diagram schematically showing the structure of another embodiment of the dialing system according to the present invention. This embodiment is a modification of the embodiment described by reference to FIGS. 1 and 2 in that the speech output means 8 is replaced by a comparative display means 13, and a dialed telephone number display unit 14 is additionally provided. That is, in the embodiment shown in FIG. 3, the dialed telephone number display unit 14 is connected to the comparative display means 13 for a parallel display of the two outputs compared by the comparator means 6. (In this case, it will be seen that, for example, a confirmation signal "9391350" and a wrong confirmation signal "9392350" are displayed. That is, in the latter signal "2" at the digit place of 1,000 should correctly be "1".)

Therefore, the embodiment shown in FIG. 3 differs from the embodiment shown in FIG. 1 in that, unlike the confirmation of a dialed telephone number by an audible signal in the case of the first embodiment, manual dialing of a wrong telephone number can be instantaneously visually confirmed. Thus, a telephone number dialed before and stored can be sent out again as in the case of the first embodiment.

We claim:

1. A dialing system for use in a telephone system, comprising:

dialed telephone number memory means for storing a dialed telephone number consisting of a required number of digits, comparator means for comparing first individual digit data of the dialed telephone number stored in said memory means and second individual digit data of a telephone number presently being manually dialed and for generating a first output when more than a first predetermined number of the digits of said first and second individual digit data coincide with each other while less than a second predetermined number of said digits of said first and second individual digit data do not coincide with each other, alarm output means for issuing an alarm in response to said first output of said comparator means, speech output means for generating a speech output announcing the dialed telephone number stored in said memory means and compared by said comparator means, a specified special key for manipulation by a user of said dialing system to generate a selection unit, and confirmed dialed telephone number sender means for sending out the dialed telephone number announced by said speech output means in response to said selection input generated by manipulation of said specified special key, whereby when a telephone number is incorrectly dialed during manual re-dialing of a telephone number previously dialed and stored in the memory means, an alarm is issued, and the telephone number previously dialed is confirmed by generation of said speech output so that the telephone number previously dialed can be sent out again.

2. A dialing system according to claim 1, further comprising display means for providing a luminous display or a flickering display in response to said first output from the comparator means.

3. A dialing system according to claim 1, further comprising comparative display means for distinguishably displaying at least a coincidence number part and a non-coincidence number part of the first and second individual digit data compared by said comparator means so that, when the dialed telephone number stored in said memory means is manually re-dialed, the coincidence number part and the non-coincidence number part are distinguishably displayed by said comparative display means, and luminous display means for displaying the coincidence number part and the non-coincidence number part so as to be visually distinguished from each other.

4. A dialing system according to claim 1, further comprising means for closing an associated central office line switching circuit to send out said second individual digit data when said comparator means determines that the first and second individual digit data completely coincide with each other.

5. A dialing system according to claim 1, wherein said comparator means generates a second output when more than said first predetermined number of said digits of said first and second individual digit data do not coincide with each other.

6. A dialing system according to claim 1, further comprising a display means for providing a luminous or flickering display in response to said first output of said comparator means and means for generating a signal to close an associated central office line switching circuit and wherein when at least one of said (a) alarm output means issues said alarm and (b) said display means provides said luminous or flickering display, the second individual digit data are newly stored in said memory means unless said specified special key is manipulated, and said means for generating generates said signal to close said associated central office line switching circuit so as to send out said second individual digit data.

7. A dialing system according to claim 5, wherein when said comparator means outputs said second signal, said second individual digit data are newly stored in said memory means, and said system further comprises means for closing an associated central office line switching circuit so as to send out said second individual digit data that is newly stored in said memory means.

8. A dialing system according to claim 1, wherein said first predetermined number equals said second predetermined number.

9. A dialing system according to claim 1, wherein said first predetermined number is one-half of said digits of said first and second individual digit data.

10. A dialing system according to claim 1, wherein said second predetermined number is one.

11. A dialing system according to claim 1, wherein said second predetermined number is two.

12. A dialing system according to claim 3, wherein said luminous display means provides a flickering display of at least one of said coincidence number part and said non-coincidence number part.

* * * * *